United States Patent
Suzuki (10) Patent No.: US 6,729,426 B2
(45) Date of Patent: May 4, 2004

(54) DRIVING FORCE CONTROLLING APPARATUS AND METHOD FOR FOUR-WHEEL DRIVE VEHICLE

(75) Inventor: Hidetoshi Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/175,823

(22) Filed: Jun. 21, 2002

(65) Prior Publication Data

US 2003/0010559 A1 Jan. 16, 2003

(30) Foreign Application Priority Data

Jul. 13, 2001 (JP) .......................... 2001-213666

(51) Int. Cl.$^7$ ............................................. B60K 17/344
(52) U.S. Cl. ..................... 180/197; 180/233; 701/69; 701/89
(58) Field of Search ................................ 180/197, 233, 180/248; 701/69, 70, 82–84, 88–90

(56) References Cited

U.S. PATENT DOCUMENTS

| | | | | |
|---|---|---|---|---|
| 4,989,686 A | * | 2/1991 | Miller et al. ............... 180/197 |
| 5,014,809 A | * | 5/1991 | Matsuda ..................... 180/248 |
| 5,631,829 A | | 5/1997 | Takasaki et al. ...... 364/424.098 |
| 5,701,247 A | * | 12/1997 | Sasaki ........................... 701/1 |
| 5,720,688 A | | 2/1998 | Wilson et al. |
| 5,803,197 A | | 9/1998 | Hara et al. |
| 5,850,616 A | * | 12/1998 | Matsuno et al. ............... 701/82 |
| 5,947,224 A | | 9/1999 | Kouno |
| 6,094,614 A | * | 7/2000 | Hiwatashi ..................... 701/89 |
| 6,189,643 B1 | * | 2/2001 | Takahashi et al. ............ 180/248 |
| 6,549,840 B1 | * | 4/2003 | Mikami et al. ................ 701/69 |
| 6,564,140 B2 | * | 5/2003 | Ichikawa et al. ............. 701/91 |

FOREIGN PATENT DOCUMENTS

| | | |
|---|---|---|
| JP | 1-94025 | 4/1989 |
| JP | 7-172204 | 7/1995 |
| JP | 7-186758 | 7/1995 |
| JP | 9-136554 | 5/1997 |
| JP | 10-272947 | 10/1998 |

\* cited by examiner

Primary Examiner—Lesley D. Morris
Assistant Examiner—L. Lum
(74) Attorney, Agent, or Firm—Foley & Lardner (57) ABSTRACT

In driving force controlling apparatus and method for a four-wheel drive vehicle, a driving force distribution controller determines whether there is a vehicular driver's demand on the driving force, calculates a driving force distribution ratio between front and rear road wheels in such a manner that a driving force distribution rate for auxiliary driven wheels is updated to its maximum value on the basis of a slip quantity of main driven wheels when determining that there is the vehicular driver's demand on the driving force, calculates another driving force distribution ratio therebetween in accordance with the acceleration slip quantity when determining that there is no vehicular driver's demand on the driving force, and is operated to adjust variably the driving force therebetween in such a manner that the driving force distribution ratio between the front and rear road wheels indicates that calculated by either one of the above-described two methods.

20 Claims, 5 Drawing Sheets

DRIVING FORCE CONTROLLING APPARATUS AND METHOD FOR FOUR-WHEEL DRIVE VEHICLE

BACKGROUND OF THE INVENTION

1. Field of the Invention

The present invention relates to driving force controlling apparatus and method for a four-wheel drive vehicle.

2. Description of the Related Art

A previously proposed driving force controlling apparatus for the four-wheel drive vehicle is exemplified by a Japanese Patent Application First Publication No. Heisei 7-172204 published on Jul. 11, 1995.

In the previously proposed driving force controlling apparatus disclosed in the above-described Japanese Patent Application First Publication, road wheel velocity sensors detect respective road wheel velocities, determines a difference in the road wheel velocities between front and rear road wheels (hereinafter, referred to as a front-and-rear road wheel velocity difference), determines a variation rate of the front-and-rear road wheel velocity difference, and sets a driving force distribution between the front and rear road wheels according to the front-and-rear road wheel velocity difference and its variation rate. That is to say, the vehicle in which the above-described driving force controlling apparatus is mounted falls in a four-wheel drive state only when at least one of rear left and right road wheels develops an acceleration slip and the front-and-rear road wheel velocity difference occurs.

SUMMARY OF THE INVENTION

However, since, in the above-described driving force controlling apparatus for the four-wheel drive vehicle, the vehicle does not fall in the four-wheel drive state unless the front-and-rear road wheel velocity difference is generated, it is impossible to run continuously under the four-wheel drive state in order to secure a running stability and a running through performance in a case where the four-wheel drive vehicle is running on a slippery low frictional coefficient ($\mu$) road surface or a rough road. In addition, since, in the previously proposed driving force controlling apparatus described above, main driven wheels are in a slippage state at a time of the four-wheel drive state, there is no margin in a gripping force on the main driven wheels and it is not preferable with a vehicular stability taken into consideration. Furthermore, in the above-described previously proposed driving force controlling apparatus, there may be a case where four-wheel drive state and two-wheel drive state are repeated on the road surface having a low frictional coefficient $\mu$. In this case, an unpleasant feeling may be given to the vehicular driver due to variations in a vehicular acceleration and vehicular velocity caused by a mechanical loss and an electrical loss during the four-wheel drive state.

It is, hence, an object of the present invention to provide driving force controlling apparatus and method for the four-wheel drive vehicle which can cause the vehicle to run continuously under the four-wheel drive condition only during an occurrence of its necessity.

According to one aspect of the present invention, there is provided a driving force controlling apparatus for a four-wheel drive vehicle, comprising: main driven wheels which are one of front and rear road wheels; auxiliary driven wheels which are the other of the front and rear road wheels; a slip detecting section that detects an acceleration slip quantity of the main driven wheels; a driving force demand determining section that determines whether there is a vehicular driver's demand on the driving force; an auxiliary driven wheel driving force distribution rate maximum value updating section that calculates a driving force distribution ratio between the front and rear road wheels in such a manner that a driving force distribution rate for the auxiliary driven wheels is updated to its maximum value on the basis of the slip quantity of the main driven wheels detected by the slip detecting section when the driving force demand determining section determines that there is the vehicular driver's demand on the driving force; a slip responsive driving force distribution ratio calculating section that calculates the driving force distribution ratio between the front and rear road wheels in accordance with the acceleration slip quantity when the driving force demand determining section determines that there is no vehicular driver's demand on the driving force; and a driving force adjusting section that adjusts variably the driving force between the front and rear road wheels in such a manner that the driving force distribution ratio between the front and rear road wheels indicates that calculated by at least one of the auxiliary driven wheel driving force distribution rate maximum value calculating section and the slip responsive driving force distribution ratio calculating section.

According to another aspect of the present invention, there is provided a driving force controlling apparatus for a four-wheel drive vehicle, comprising: driving force controlling apparatus for a four-wheel drive vehicle, comprising: main driven wheels which are one of front and rear road wheels; auxiliary driven wheels which are the other of the front and rear road wheels; a slip detecting section that detects an acceleration slip quantity of the main driven wheels; a driving force demand determining section that determines whether there is a vehicular driver's demand on the driving force; an auxiliary driven wheel driving force distribution rate maximum value updating section that calculates a driving force distribution ratio between the front and rear road wheels in such a manner that a driving force distribution rate for the auxiliary driven wheels is updated to its maximum value on the basis of the acceleration slip quantity of the main driven wheels detected by the slip detecting section when the driving force demand determining section determines that there is the vehicular driver's demand on the driving force; an auxiliary driven wheel driving force distribution rate reducing section that calculates the driving force distribution ratio between the front and rear road wheels in such a manner that the driving force distribution rate for the auxiliary driven wheels is reduced or zeroed when there is no vehicular driver's demand on the driving force; and a driving force adjusting section that adjusts variably the driving force between the front and rear road wheels in such a manner that the driving force distribution ratio between the front and rear road wheels indicates that calculated by at least one of the auxiliary driven wheel driving force distribution rate maximum value calculating section and the auxiliary driven road wheel driving force distribution rate reducing section.

According to a still further aspect of the present invention, there is provided a driving force controlling method for a four-wheel drive vehicle, the four-wheel drive vehicle including main driven wheels which are one of front and rear road wheels; and auxiliary driven wheels which are the other of the front and rear road wheels, the driving force controlling method comprising: detecting an acceleration slip quantity of the main driven wheels; determining whether there is a vehicular driver's demand on the driving force; calculating a driving force distribution ratio between the front and rear road wheels in such a manner that a driving force distribution rate for the auxiliary driven wheels is updated to its maximum value on the basis of the slip quantity of the main driven wheels detected by the slip detecting section when determining that there is the vehicular driver's demand on the driving force; calculating the driving force distribution ratio between the front and rear road wheels in accordance with the acceleration slip quantity when determining that there is no vehicular driver's demand on the driving force; and variably adjusting the driving force between the front and rear road wheels in such a manner that the driving force distribution ratio between the front and rear road wheels indicates that calculated at least one of such a manner that a driving force distribution rate for the auxiliary driven wheels is updated to its maximum value and such a manner as calculated in accordance with the acceleration slip quantity.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
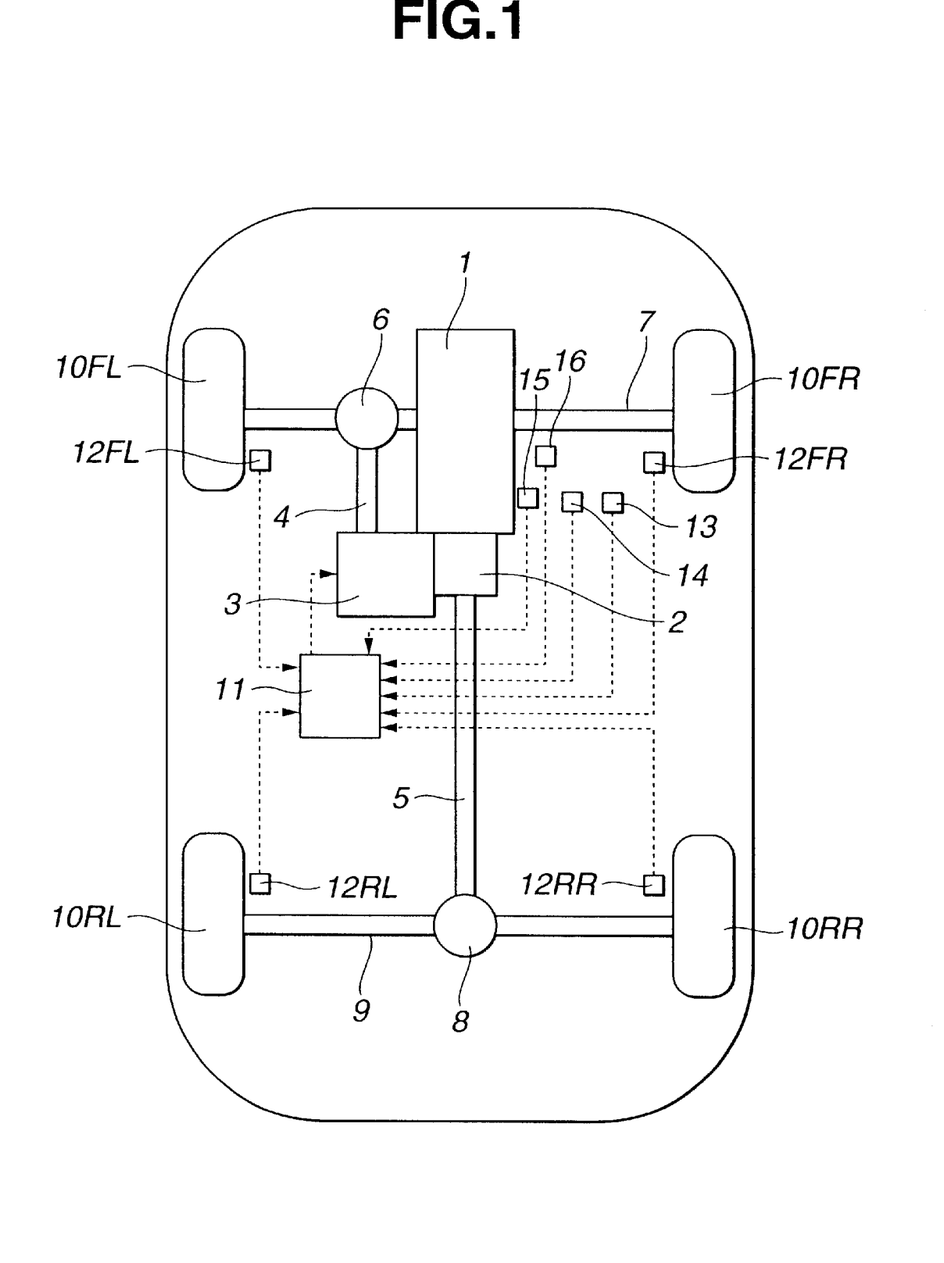
FIG. 1 is a whole system configuration view of a rear wheel drive based four-wheel drive vehicle to which a driving force controlling apparatus in a first preferred embodiment according to the present invention is applicable.

FIG. 1 shows a system configuration view of a rear wheel drive based four-wheel drive vehicle to which a driving force controlling apparatus in a first preferred embodiment according to the present invention is applicable.

In FIG. 1, an output of an engine 1 of the four-wheel drive vehicle undergoes a driving force distribution for front and rear road wheels by means of a driving force distribution control actuator 3 via a transmission 2 and is transmitted to a front propeller shaft 4 and rear propeller shaft 5. The driving force transmitted to front propeller shaft is transmitted to front right and front left road wheels 10FR and 10FL via a front differential 6 and a front wheel axle 7. In the same way, the driving force transmitted rear propeller shaft 5 is transmitted to rear right and rear left road wheels 10RR and 10RL via a rear differential 8 and a rear axle 9.

Vehicular velocity sensors 12FR, 12FL, 12RR, and 12RL are equipped on respective road wheels 10FR, 10FL, 10RR, and 10RL and their respective values are outputted to a driving force distribution controller 11. In addition, driving force distribution control actuator 3 includes, for example, a hydraulic clutch interposed between transmission 2 and front propeller shaft 4. It is noted that, in place of the hydraulic clutch, an electromagnetic clutch may be adopted.

Respective detected values of an accelerator switch 13 and a brake switch 14 are outputted to a driving force distribution controller 11. Accelerator switch 13 and brake switch 14 serve to detect a vehicular driver's demand on the driving force. Accelerator switch 13 detects a presence or absence of an accelerator manipulation and brake switch 14 detects a presence or absence of a brake manipulation. It is noted that, in place of accelerator switch 13, an accelerator opening angle sensor may be used to detect a state of an opening angle of the accelerator and a brake stroke sensor to detect a brake pedal stroke variable in place of brake switch 14 may be used.

In addition, an engine speed sensor 15 to detect an engine speed of engine 1 is provided. Its detected value of engine speed sensor 15 is outputted to driving force distribution controller 11. A throttle opening angle sensor 15 is disposed within a throttle valve of an intake air passage of engine 1 and is outputted to driving force distribution controller 11.

Driving force distribution controller 11 receives the detected value of each sensor and calculates an acceleration slip quantity of main driven wheels (in the first embodiment, the main driven wheels are the rear right and left road wheels 10RR and 10RL). First, detected values of road wheel velocity sensors 12FR, 12FL, 12RR, and 12RL, detected value of the engine speed sensor 15, and detected value of throttle valve opening angle sensor 16 are received by driving force distribution controller 11. Driving force distribution controller 11 derives the transmission torque of the main driven wheels and acceleration torque of the main driven wheels and calculates a road surface reaction force torque which is the acceleration slip quantity from the derived torque values. Then, driving force distribution controller 11 controls the driving force distribution between the front and rear road wheels 10FR through 10RL in such a manner that a command on the distribution of the driving force in accordance with the road surface reaction force torque is outputted to driving force distribution control actuator 3 from a state such that a driving force distribution ratio between front and rear road wheels is ordinarily front road wheels of 0% rear road wheels of 100%. Driving force distribution control actuator 3 controls an engagement force to hydraulic clutch so as to control the driving force distribution between the front and rear road wheels 10FR and 10FL and 10RR and 10RL.

Figure 2:
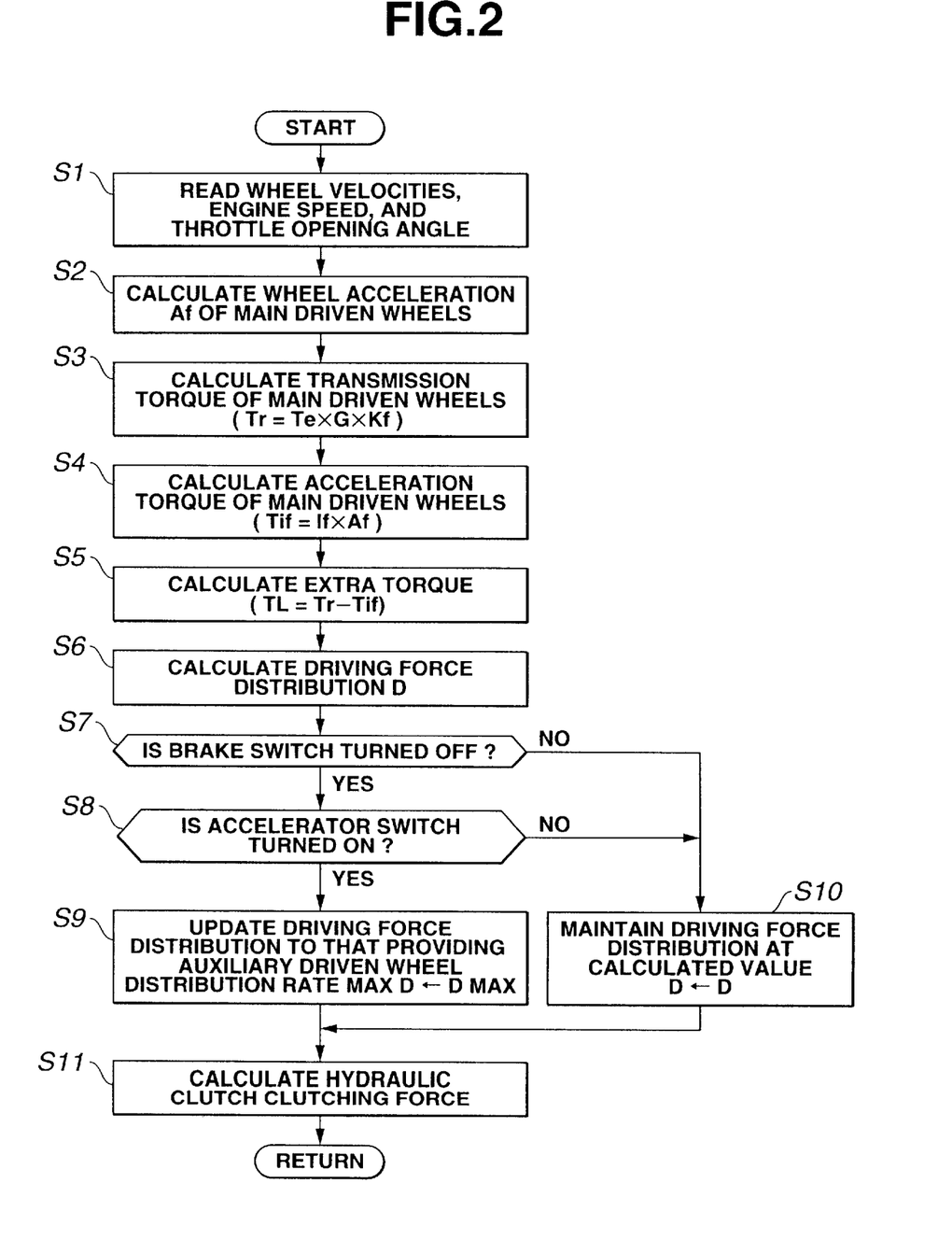
FIG. 2 is a control flowchart representing a flow of the control of a driving force in the first preferred embodiment according to the present invention.

FIG. 2 shows a control procedure executed by driving force distribution controller 11 in the driving force controlling apparatus in the case of the first embodiment. The processing flowchart is executed for, for example, each predetermined period of time of 10 milliseconds.

At a step S1, driving force distribution controller 11 reads the respective detected values of road wheel velocity sensors 12FR, 12FL, 12RR, and 12RL, detected value of engine speed sensor 15, detected angle value of throttle valve opening angle sensor 16. At the next step S2, driving force distribution controller 11 derives vehicular road wheel accelerations of the main driven wheels on the basis of each detected value of the inputted road wheel velocity sensors 12RR and 12RL and derives a road wheel acceleration Af of the main driven wheels from an average value of the road wheel velocities of rear right and left road wheels 10RR and 10RL and the routine goes to a step S3.

At a step S3, driving force distribution controller 11 derives an engine output torque Te from the detected value of engine speed sensor 15 and that of throttle opening angle sensor 16, calculates a transmission torque Tr of the main driven wheels by multiplying engine output torque Te, a gear ratio G of transmission 2 including an amplification ratio of a torque converter, and a driving force distribution rate Kf of the main driven wheels. Then, the routine goes to a step S4. At step S4, driving force distribution controller 11 calculates an acceleration torque Tif of the main driven wheels, viz., a road surface reaction force limit torque by multiplying a drive system inertia of the main driven wheels (including the gear ratio) with the road wheel acceleration Af of the main driven wheels. At a step S5, driving force distribution controller 11 calculates an extra torque TL by subtracting acceleration torque Tif of the main driven wheels from transmission torque Tr of the main driven wheels. At a step S6, driving force distribution controller 11 calculates driving force distribution D in accordance with extra torque TL so that as the extra torque TL becomes large, the driving force distribution rate for the auxiliary driven wheels becomes large. Then, the routine goes to a step S7.

At step S7, driving force distribution controller 11 determines whether the brake manipulation is carried out by inputting the detected value of brake switch 14. If driving force distribution controller 11 determines that brake switch 14 is turned off, viz., determines that brake manipulation is not operated, the routine goes to a step S8. If driving force distribution controller 11 determines that brake switch 14 is turned on, viz., the brake manipulation is carried out (No), the routine goes to a step S10. At step S8, if driving force distribution controller 11 determines that the accelerator switch 13 is turned on, viz., the acceleration manipulation is carried out, the routine goes to a step S9.

If driving force distribution controller 11 determines that the accelerator switch 14 is turned off, viz., the accelerator manipulation is not carried out (No) at step S8, the routine goes to step S10. At step S9, driving force distribution controller 11 executes a maximum value update process such that, when a driving force distribution rate for auxiliary driven wheels (front right and left road wheels 10FR and 10FL) calculated at the present calculation cycle is larger than that calculated at a previous calculation cycle, the driving force distribution rate is updated to the present value (maximum value) and, when the driving force distribution rate for the auxiliary driven wheels calculated at the present calculation cycle is not larger than that calculated at a previous calculation cycle, the driving force distribution rate is not updated to the present value (maximum value) but remains at the same as the previous value calculated at the previous calculation cycle. Then, the routine goes from step S9 to a step S11. At step S10, the value of driving force distribution calculated at the present calculation cycle is set to be used without a change (D←D). At step S11, driving force distribution controller 11 calculates a command value to control the engagement force of hydraulic clutch of the driving force distribution control actuator 3 which satisfies a value of the driving force distribution processed at step S9 or step S10 and outputs the command value to driving force distribution control actuator 3. Then, the routine goes to a return process. It is noted that although, at step S6, driving force distribution controller 11 calculates driving force distribution D in accordance with extra torque, driving force distribution controller 10 may calculate an extra reaction force from extra torque and a rotation radius of the corresponding road wheel.

Figure 3A:
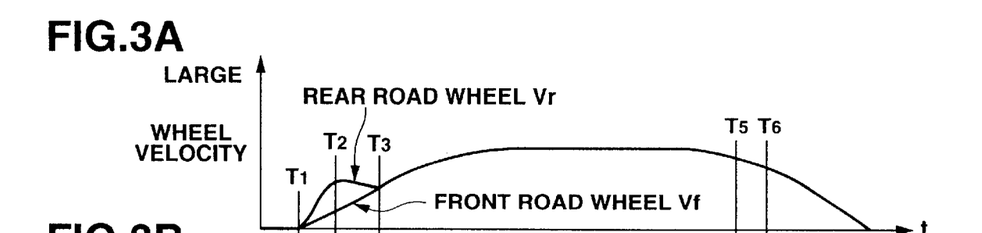
FIGS. 3A, 3B, 3C, 3D, 3E, and 3F are timing charts in a case where the driving force control is carried out in the first embodiment of the driving force controlling apparatus according to the present invention.
Figures 3B, 3C:
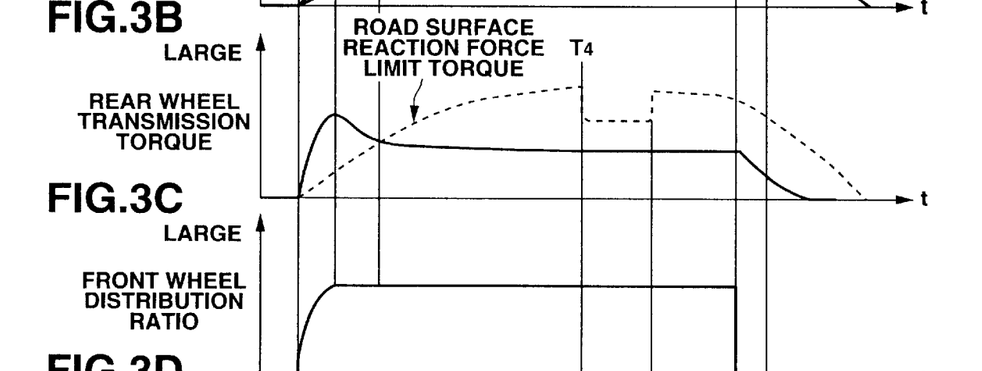
Figures 3D, 3E, 3F:
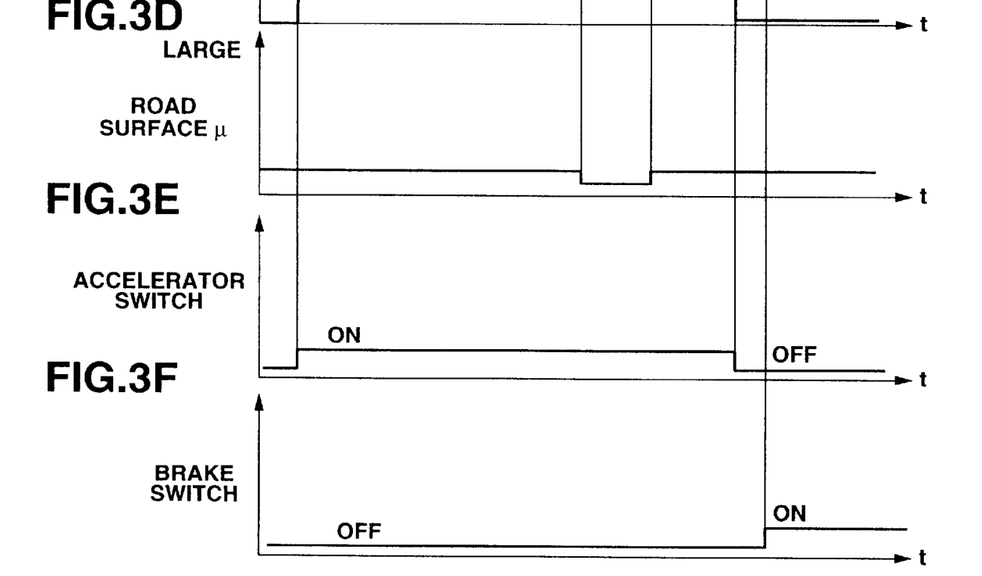

FIGS. 3A through 3F show integrally timing charts for explaining an operation of the driving force controlling apparatus in the first embodiment. FIG. 3A shows a time variation of a road wheel velocity Vf of the front tire wheels and Vr of the rear tire wheels. FIG. 3B shows a time variation of rear road wheel transmission torque. FIG. 3C shows a time variation in a front road wheel driving force distribution rate. FIG. 3D shows a time variation in a frictional coefficient between a tire wheel and a road surface on which the vehicle is running. FIG. 3E shows a variation time of the detected value of accelerator switch 13. FIG. 3F shows a variation time of the detected value of brake switch 14.

First, suppose that the vehicular driver depresses accelerator to start the vehicle at a time point of T1. As shown in a solid line of FIG. 3B, the transmission torque of the rear road wheels is raised so as to exceed the road surface reaction force limit torque of the rear road wheels 10RR and 10RL denoted by a broken line of FIG. 3B. At this time, the rear road wheels develop acceleration slips thereon. Consequently, as shown in FIG. 3A, the road wheel velocity Vr of the rear road wheels becomes higher than that Vf of the rear road wheels. In addition, since accelerator switch 13 shown in FIG. 3E is turned on at time point $T_1$ and brake switch 14 shown in FIG. 3E is turned off, driving force distribution controller 11 executes the maximum value update process in such a manner that the driving force distribution rate for the front road wheels gives the maximum value. Thereafter, when the time passes a time point $T_2$, a difference between rear road wheel transmission torque and road surface reaction force limit torque becomes small as shown in FIG. 3C. During a time duration during which the accelerator switch 13 is turned on and the brake switch 14 is turned off, the maximum value updating process causes the driving force distribution rate for the front road wheels 10FR and 10FL to be continued to be the maximum value as shown in FIG. 3C by means of the maximum value update process described above.

Thereafter, at a time point of $T_3$, the acceleration slip of the rear road wheels is converged so that the difference between the rear road wheel transmission torque and road surface reaction force limit torque becomes zeroed. However, since accelerator switch 13 is turned on and brake switch 14 is turned off, the driving force distribution is continued with the maximum value update process continued. Hence, the driving force distribution rate for the front road wheels has the maximum value continued to be updated as shown in FIG. 3C so that the vehicle can continue the four-wheel drive state. Thereafter, at a time point of $T_4$, the vehicle is transferred to a state in which the road surface frictional coefficient becomes lower and the road surface reaction force limit torque for the rear road wheels is reduced. However, since the four-wheel drive state is continued, the transmission torque of the rear road wheels does not exceed the road surface reaction force limit torque. Thus, the acceleration slips on rear road wheels 10RR and 10RL are not again developed any more.

Thereafter, at a time point of $T_5$, the vehicular driver stops accelerator manipulation. Since the accelerator switch 13 is turned off driving force distribution controller 11 determines that there is no vehicular driver's demand on the driving force, stops the maximum value update process, and executes such a process that the driving force distribution rate is a value calculated in accordance with an actual difference between the rear road wheel transmission torque and road surface reaction force limit torque. However, in this case, since the difference between the rear road wheel transmission torque and the road surface reaction force limit torque is not present, the driving force distribution rate for the front road wheels gives zero. Consequently, the vehicle is in the two-wheel drive state. Thereafter, at a time point of T6, the vehicular driver carries out the brake manipulation so that brake switch 14 is turned on. However, since at time point T5, driving force distribution controller 11 has already determined that there is no vehicular driver's demand on the driving force according to the turned OFF state of accelerator switch 13, driving force distribution controller 11 continues the process such that the driving force distribution is the value of the driving force distribution calculated in accordance with the actual difference between the rear road wheel transmission torque and the road surface reaction force limit torque. It is noted that in a case where there is no vehicular driver's demand on the driving force, in place of the maximum value update process, the driving force distribution is calculated in accordance with the actual difference between the rear road wheel transmission torque and road surface reaction force limit torque. Hence, in a case where the acceleration slips on the rear road wheels are large due to an excessive accelerator manipulation and the difference between the transmission torque of the rear road wheels and road surface reaction force limit torque is not converged due to a still developing inertia after driving force distribution controller 11 determines that there is no vehicular driver's demand on the driving force, the vehicle continues the four-wheel drive state according to the actual difference between the rear road wheel transmission torque and the road surface reaction force limit torque. Consequently, no abrupt switching of the drive state into the two-wheel drive state occurs and a superior vehicular stability can be assured.

Next, a second preferred embodiment of the driving force distribution controlling apparatus will be described below. The whole system configuration in the second embodiment is the same as that described in the first embodiment shown in FIG. 1. However, difference points of the driving force controlling apparatus in the second embodiment from that in the first embodiment are as follows: The structure of calculating the acceleration slip quantity of the main driven wheels executed in driving force distribution controller 11, of updating the maximum value of the driving force distribution rate for the auxiliary driven wheels, of no presence in the absence of the vehicular driver driving force command, and of calculating the driving force distribution in the case where the vehicle velocity is equal to or below a predetermined vehicular velocity.

The structure of calculating the acceleration slip quantity of the main driven wheels is that driving force distribution controller 11 receives detected values of road wheel velocity sensors 12FR, 12FL, 12RR, and 12RL, determines an average value of the respective front left and right road wheels and rear left and right road wheels, calculates their average values of the front right and left road wheels and of the rear right and left road wheels, and calculates a difference in revolution speed between the front and rear road wheels which is the difference between the average value of the front road wheels and that of the rear road wheels, the difference corresponding to the acceleration slip quantity on the rear road wheels.

In addition, the structure of the maximum value update process on the driving force distribution rate on the auxiliary driven wheels is that the front and rear road wheel velocity difference calculated as the acceleration slip quantity is updated to the maximum value and the driving force distribution is calculated in accordance with the front-and-rear road wheel velocity difference to which the maximum value is updated. In addition, if there is no vehicular driver's demand on the driving force, the driving force distribution is calculated so that the distribution rate of the driving force for the auxiliary driven wheels is reduced in accordance with a reduction in a vehicular body velocity. The structure of calculating the driving force distribution in a case where the vehicular velocity falls in a velocity equal to or below a predetermined vehicular velocity is that another driving force distribution calculating means is provided, the value of the driving force distribution calculated herein is compared with the value of the driving force distribution calculated on the basis of the acceleration slip quantity, and the value of the driving force distribution of the larger driving force distribution rate on the auxiliary driven wheels is selected. Furthermore, driving force distribution controller 11 calculates vehicular body velocity on the basis of the inputted road wheel velocities.

Figure 4:
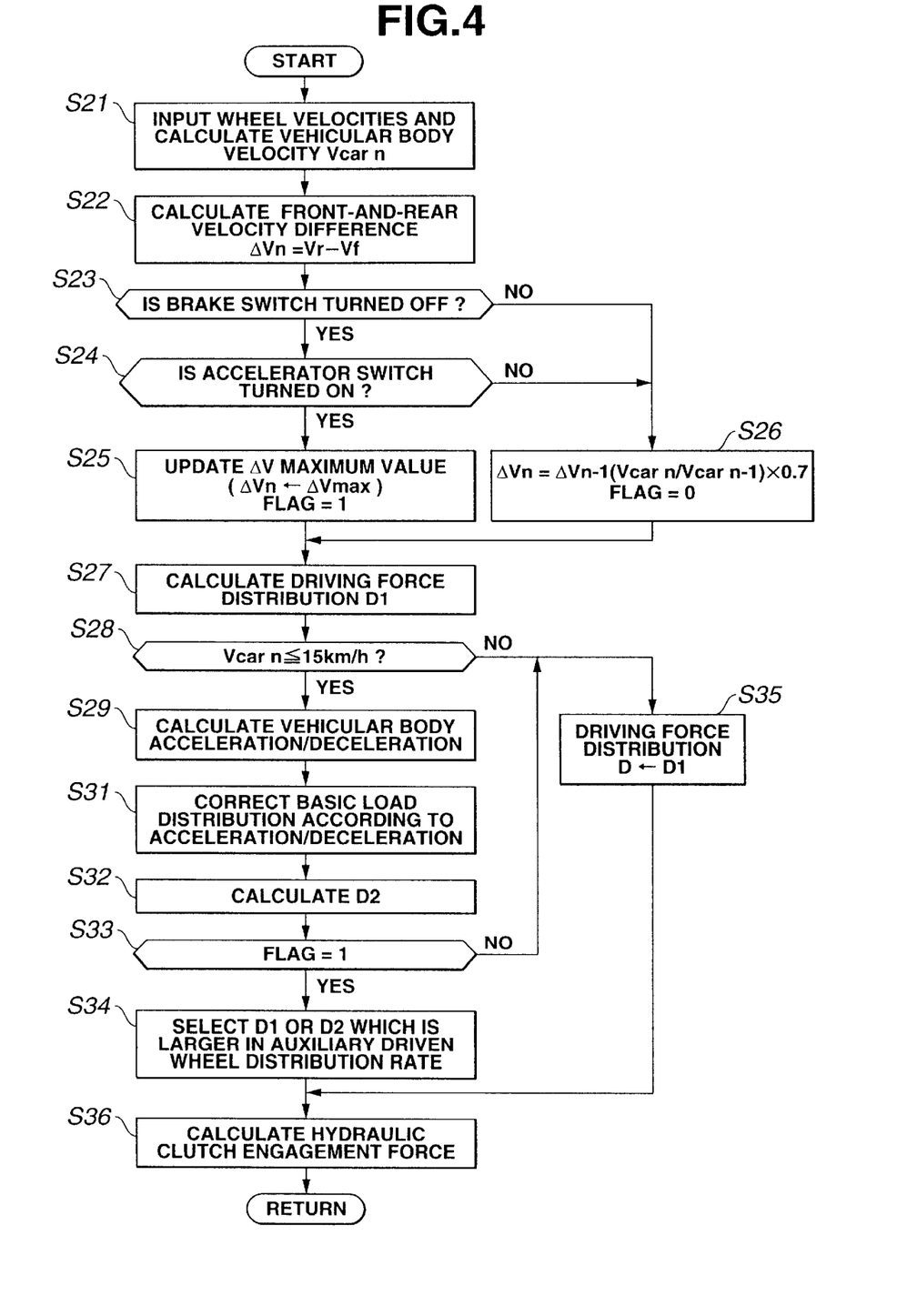
FIG. 4 is a control flowchart representing a flow of the driving force control carried out in a second preferred embodiment according to the present invention.

Next, a control procedure executed in driving force distribution controller 11 will be described below with reference to a control flowchart shown in FIG. 4. It is noted that the flowchart shown in FIG. 4 is executed whenever the predetermined period of time of 10 milliseconds is elapsed.

First, at a step S21, driving force distribution controller 11 receives respective detected values of road wheel velocity sensors 12FL, 12FR, 112RL, and 12RR, derives a vehicular body velocity Vcarn on the basis of road wheel velocities, and the routine goes to a step S22. At step S22, driving force distribution controller 11 derives the average value of the front right and left road wheel velocities and that of the rear right and left road wheel velocities on the basis of the received road wheel velocities and calculates the front-and-rear road wheel velocity difference ΔVn by subtracting the front road wheel velocity average value (the front road wheels are auxiliary driven wheels) from the rear road wheel velocity average value (the rear road wheels are the main driven wheels). Then, the routine goes to a step S23. At step S23, driving force distribution controller 11 inputs the detected value of brake switch 14 to determine whether brake manipulation is carried out. If brake switch 14 is turned off, viz., no brake manipulation is carried out (Yes) at step S23, the routine goes to a step S24. If brake switch 14 is turned on, viz., the brake manipulation is carried out (No) at step S23, the routine goes to a step S26. At step S24, driving force distribution controller 11 receives the detected value of accelerator switch 13 to determine whether the accelerator manipulation is carried out. If accelerator switch 13 is turned on, viz., the accelerator manipulation is carried out (Yes) at step S25, the routine goes to a step S25. If accelerator switch 13 is turned off, viz., the accelerator manipulation is not carried out (No) at step S24, the routine goes to a step S26. At step S25, driving force distribution controller 11 updates the front-and-rear road wheel velocity difference ΔV to the presently calculated front-and-rear road wheel velocity difference (maximum value) when the presently calculated road wheel velocity difference ΔVn calculated at the present calculation cycle is higher than a previously calculated front-and-rear road wheel velocity difference ΔVn−1 calculated at a previous calculation cycle or to the previously calculated front-and-rear road wheel velocity difference ΔVn−1 when the presently calculated road wheel velocity difference ΔVn calculated at the present calculation cycle is not higher than the previously calculated front-and-rear road wheel velocity difference ΔVn−1 calculated at the previous calculation cycle. That is to say, at step S25, driving force distribution controller 11 updates the value of front-and-rear road wheel velocity difference ΔVn which is used to calculate the driving force distribution to the maximum value thereof. Then, a flag representing the execution of the maximum value update process is set to "1"

and the routine goes to a step S27. On the other hand, at step S26, driving force distribution controller 11 carries out such a process that a value ΔVn−1 of the front-and-rear road wheel velocity difference used for the calculation on the driving force distribution at the time of the previous calculation period is multiplied by a division value of vehicular body velocity Vcar n determined at the present calculation cycle by a previously calculated vehicular body velocity Vcar n−1 with a predetermined coefficient of 0.7 is the front-and-rear road wheel difference value ΔVn used for the driving force distribution (ΔVn=ΔVn−1×(Vcar n/Vcar n−1)×0.7). That is to say, at step S27, driving force distribution controller 11 executes such a process that the front-and-rear road wheel velocity difference to calculate driving force distribution is reduced in accordance with vehicular body velocity, the corresponding flag is reset to "0", and the routine goes to step S27. At step S27, driving force distribution controller 11 calculates a front-and-rear road wheel driving force distribution D1 in accordance with the value of front-and-rear road wheel velocity difference ΔVn processed at step S25 or step S26 from a calculation equation or a map which indicates a characteristic such that the driving force distribution rate for the auxiliary driven wheels becomes increased as the acceleration slip quantity becomes increased as shown in FIG. 8, for example, disclosed in a Japanese Patent Application First Publication No. Heisei 1-94025 published on Apr. 12, 1989 and the routine goes to a step S28.

At step S28, driving force distribution controller 11 determines whether vehicular body velocity Vcar n is equal to or lower than a predetermined vehicular velocity of 15 Km/h. If the vehicular body velocity Vcar n is equal to or lower than the predetermined vehicular velocity, the routine goes to the step S29. If vehicular body velocity Vcar n is higher than the predetermined vehicular velocity, the routine goes to a step S35. At step S29, driving force distribution controller 11 calculates a variation rate of the vehicular body velocity, namely, acceleration or deceleration and the routine goes to a step S31. At step S31, driving force distribution controller 11 corrects a basic weight distribution ratio between front and rear road wheels in accordance with the vehicular acceleration/deceleration predetermined from the vehicular specification, the routine goes to step S32. That is to say, at step S31, driving force distribution controller 11 corrects the variation rate of the load distribution since the load distribution of the rear road wheels during the acceleration is increased and the load distribution of the front road wheels during the deceleration is increased. At step S32, driving force distribution controller 11 calculates driving force distribution D2 in accordance with the load distribution. For example, when the vehicle in which a basic load distribution ratio is front road wheels of 50%: rear road wheels of 50% is load moved due to the acceleration so that the ratio is front road wheels of 40%: rear road wheels of 60%, driving force distribution controller 11 changes the driving force distribution to a state in which the driving force distribution is front road wheel of 40% rear road wheel of 60% and the routine goes to a step S33. It is noted that the driving force distribution of D1 at step S27 is calculated by another different method from that of D2 at step S32. At step S33, driving force distribution controller 11 determines if the flag described above indicates "1". If the flag indicates "1" at step S33, the routine goes to a step S34. If the flag does not indicate "1" (No), the routine goes to a step S35. At step S34, driving force distribution controller 11 compares driving force distribution D1 calculated at step S27 with driving force distribution D2 calculated at step S32 to select one of the two driving force distributions D1 and D2 whose driving force distribution rate on the auxiliary driven wheels is larger than the other and the routine goes to a step S36. At step S35, driving force distribution controller 11 executes such a process that the driving force distribution is that of D1 calculates at step S27. Then, the routine goes to step S36. At step S36, driving force distribution controller 11 calculates a command value to control an engagement force of the hydraulic clutch of driving force distribution control actuator 3 which satisfies the driving force distribution processed at step S34 or step S35 and outputs the command value to the driving force distribution control actuator 3 and the routine is returned to first step S21.

It is noted that, in place of the process of step S26, the value of the front and rear road wheel velocity difference may forcefully be zeroed (ΔVn=0). In addition, in place of step S26, driving force distribution controller 11 may be processed in such a manner that the front-and-rear road wheel velocity difference is calculated to reduce driving force distribution rate for the auxiliary driven wheels in accordance with the reduction of road wheel velocity as described in the claim 5 (for example, ΔVn=ΔVn−1×(Vfn/Vfn−1)×predetermined coefficient 0.7). In addition, in place of step S26, driving force distribution controller 11 may execute a process such that a predetermined value is subtracted from the value of the front-and-rear road wheel velocity difference used in the previously calculated cycle as described in the invention of the claim 6 (for example, ΔVn=ΔVn−predetermined value of 1 Km/h).

Figure 5A:
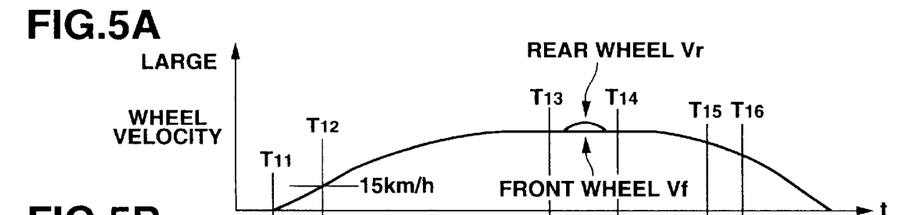
FIGS. 5A, 5B, 5C, 5D, 5E, and 5F are timing charts for explaining an operation when the driving force control is carried out in the driving force controlling apparatus in the second embodiment according to the present invention.
Figure 5B:
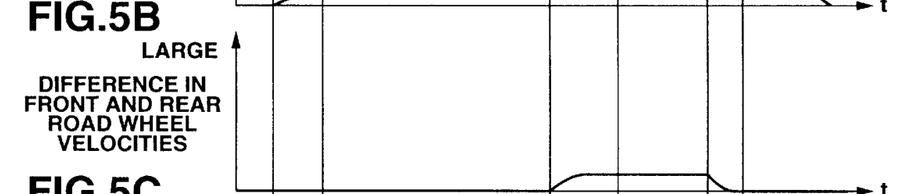

Furthermore, the operation of the second embodiment of the driving force controlling apparatus will be described with reference to the timing charts of FIGS. 5A through 5F. The conditions described in FIGS. 5A through 5F are the same as those shown in FIGS. 3A through 3F except FIG. 5B. FIG. 5B shows a time variation of the front-and-rear road wheel velocity difference of subtracting front road wheel velocity Vf from rear road wheel velocity Vr.

Figures 5C, 5D, 5E, 5F:
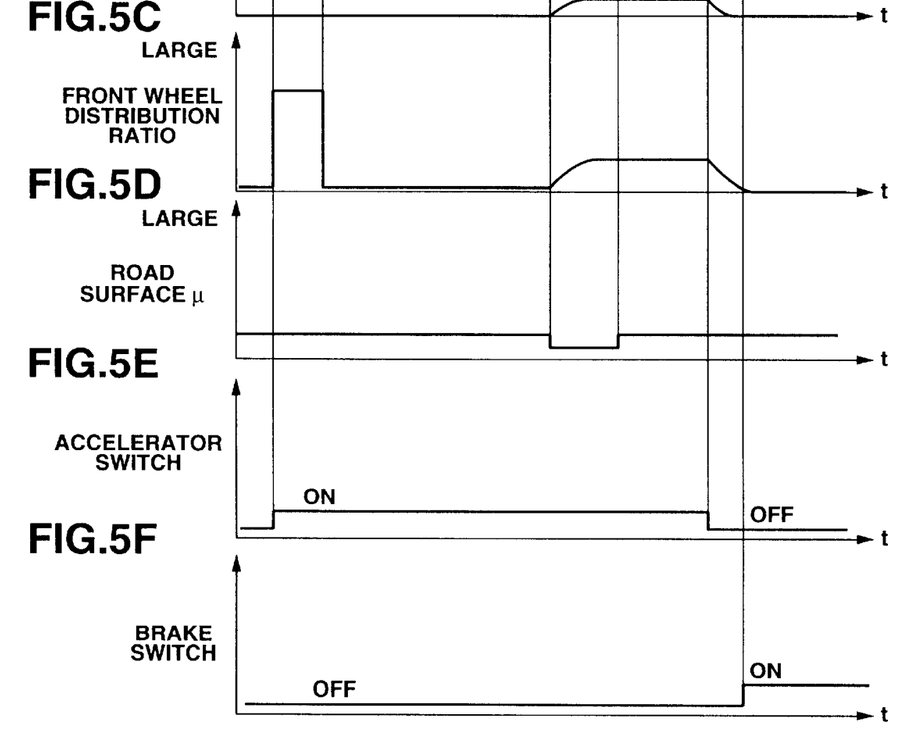

First, at a time point of T11, the vehicular driver depresses the accelerator (pedal) to start the vehicle so that the vehicular velocity reaches to 15 Km/h. Until the vehicular velocity reaches to 15 Km/h, the vehicle runs in the four-wheel drive state at the driving force distribution in accordance with the basic load distribution between the front and rear road wheels corrected in accordance with the acceleration. Thereafter, at a time point T$_{12}$, if the vehicular velocity is in excess of 15 Km/h, driving force distribution controller 11 carries out a process such that the driving force distribution accords with the front-and-rear road wheel velocity difference. As shown in FIGS. 5A and 5B, the front-and-rear road wheel difference doest not actually occur so that the vehicle is in the two-wheel drive state. Thereafter, at a time point of T$_{13}$, the vehicle running state is transferred to the state in which the road surface frictional coefficient becomes further lower and the road surface reaction force limit torque on the rear road wheels is reduced so that at least one of the rear road wheels develops the acceleration slip when the driving force on the rear road wheels exceeds the road surface reaction force limit on the corresponding rear road wheels 10RR and 10RL. At this time, since the road wheel velocities Vr of the rear right and left road wheels 10RR and 10RL are larger than those Vf of front right and left road wheels 10FR and 10FL, the front-and-rear road wheel velocity difference between the road wheel velocities Vf and Vr of front and rear road wheels is developed, as shown in FIG. 5A. As shown in FIG. 5E, accelerator switch 13 is turned on and, as shown in FIG. 5F, brake switch 13 is turned off. Hence, driving force distribution controller 11 executes the update process to update the front-and-rear road wheel velocity difference to the maximum value as shown in FIG. 5B. The driving force distribution on front and rear road wheels is controlled in accordance with the value of the front-and-rear road wheel velocity difference whose maximum value is updated, as shown in FIG. 5B. As shown in FIG. 5C, the driving force distribution for the front and rear road wheels is controlled in accordance with the front-and-rear road wheel velocity difference updated to the maximum value as shown in FIG. 5C. Hence, the driving force distribution rate on the front road wheels is continued to be updated to the maximum value. Thereafter, the actual front-and-rear road wheel velocity difference shown in FIG. 5A is continued to be decreased due to the reduction in the driving force on the rear road wheels. At a time point of $T_{14}$, the acceleration slips of the rear road wheels are converged so that the actual front-and-rear road wheel velocity difference becomes eliminated. However, since accelerator switch 13 is turned on and brake switch 14 is turned off, the maximum value is continued to be updated for the front-and-rear road wheel difference used for the calculation of the driving force by means of the maximum value update process, as shown in FIG. 5B. Consequently, since the driving force distribution rate on the front road wheels is continued under a state in which the value thereof is continued to be the maximum value, the vehicle can continue the four-wheel drive state with non-zero driving force distribution rate on the front road wheels as shown in FIG. 5C.

Thereafter, at a time point $T_{15}$, suppose that the vehicular driver stops the accelerator manipulation. At this time, accelerator switch 13 is turned off and driving force distribution controller 11 determines that there is no vehicular driver's demand on the driving force and executes such a process as to reduce the front-and-rear road wheel velocity difference calculated at the previous calculation cycle in accordance with the vehicular velocity, in place of the update process of the maximum value of the front-and-rear road wheel velocity difference. Hence, the front-and-rear road wheel velocity difference used for the calculation process becomes small as the vehicular velocity is reduced, the vehicle drive state is gradually approached to the two-wheel drive state. Thereafter, at a time point of $T_{16}$, suppose that the vehicular driver manipulates the brake so that brake switch 14 is turned on. At this time, since driving force distribution controller 11 has already determined that there is no vehicular driver's demand on the driving force due to the turn off of accelerator switch 13 at the time point of $T_{15}$, driving force distribution controller 11 continues such the process as to reduce the front-and-rear road wheel velocity difference in accordance with the vehicular velocity on the basis of the previously calculated front-and-rear road wheel velocity difference.

Thereafter, although the vehicular velocity is again equal to or lower than 15 Km/h, driving force distribution controller 11 determines that there is no vehicular driver's demand on the driving force according to the switched states of accelerator switch 13 and brake switch 14. Hence, such the maximum value update process as described above is not executed. In addition, such the subsequent process as to select one of the driving force distributions which is calculated with the maximum value updated and which is calculated in accordance with the load distribution whose driving force distribution rate for the auxiliary driven wheels is larger than the other is not executed. Such a process that the driving force distribution is continued according to only the calculated value of the driving force distribution is executed in accordance with the front-and-rear road wheel velocity difference. Then, the vehicle drive state is transferred gradually to the two-wheel drive state in accordance with the vehicular velocity.

As described hereinabove, the driving force controlling apparatus according to the present invention can assure the vehicular stability and running-through characteristic on the rough road and can continue the four-wheel drive state only when its necessity is raised. In addition, the continuation of the four-wheel drive state permits a margin in a gripping force on main driven wheels so as to be advantageous in the vehicular stability and avoids the complicated repetition of the vehicular drive states between the two-wheel drive state and the four-wheel drive state on a low frictional coefficient (low $\mu$) road surface. Consequently, the four-wheel drive vehicle in which the driving force controlling apparatus according to the present invention is mounted can prevent an unpleasant feeling due to variations in the vehicular acceleration and vehicular velocity from being given to the vehicular driver.

Steps S1 through S5 at the calculation process of FIG. 2 and steps S21 and S22 at the calculation process of FIG. 4 constitute acceleration slip detecting means. Steps S7 and S8 of the calculation process of FIG. 2 and steps S23 and S24 of the calculation process of FIG. 4 constitutes the driving force determining means. Step S9 of the calculation process of FIG. 2 and step S25 of the calculation process of FIG. 4 constitutes auxiliary driven wheel driving force distribution maximum value updating means. Step S10 of the calculation process of FIG. 2 constitutes slip responsive driving force distribution calculating means. Step S3 of the calculation process of FIG. 2 constitutes main driven wheel torque calculating means and step S4 of the calculation process of FIG. 2 constitutes road surface reaction force limit torque calculating means. In addition, step S26 of the calculation process of FIG. 4 constitutes auxiliary driven wheel driving force distribution reducing means. Steps S29 through S32 of the calculation process of FIG. 4 constitute load responsive driving force distribution calculating means. Driving force distribution control actuator 3 constitutes driving force adjusting means.

It is noted that, although, in the above-described embodiments, the driving force distribution ratio for the front and rear road wheels is calculated, a driving torque which is transmitted to the auxiliary driven wheels or a driving force which is transmitted from the auxiliary driven wheels to the road surface on which the vehicle runs may alternatively be calculated in place of the calculation of the driving force distribution ratio. It is also noted that, in the above-described first and second embodiments, the load corresponding driving force distribution calculating section sets front-and-rear load distribution ratio as the driving force distribution ratio. Alternatively, the load corresponding driving force distribution calculating section may execute such a process that the driving force distribution gives a constant driving force distribution (for example, front road wheels of 50%: rear road wheels of 50%) in accordance with the front-and-rear road wheel load distribution.

It is also noted that, in each of the first and second embodiments, driving force determining section is a combination of the accelerator manipulation and the brake manipulation. However, either one of the accelerator manipulation or the brake manipulation may be accepted. It is more preferable to accept the combination thereof since the combination thereof can more appropriately determine whether there is the vehicular driver's demand on the driving force.

It is also noted that, in each of the first and second embodiments, the vehicle is enabled to fall in the four-wheel drive state with the rear road wheels ordinarily driven to form the two-wheel drive. However, the present invention is applicable to such an arbitrary vehicle in which the four-wheel drive is enabled with a capability of controlling the driving force distribution. Although the present invention is applicable to such a four-wheel drive enabling vehicle in which the output of the engine is distributed to the front and rear road wheels as described in each of the first and second embodiments, the present invention is applicable equally to such a four-wheel drive enabling vehicle in which one of the front and rear road wheels is driven by the engine and the other of the front and rear road wheels is driven by an electric motor or in which the front road wheels and the rear road wheels are driven separately by two separate engines or electric motors.

It is also noted that, although not explained in each of the first and second embodiments, the driving force distribution may be corrected by a combination of the present invention with the well known technology (for example, a well known technology to prevent a tight braking phenomenon).

It is also noted that driving force distribution ratios D, D1, and D2 means the driving force distribution ratio between the front and rear road wheels expressed as described above (for example, front road wheels of 50%:rear road wheels of 50%).

The entire contents of Japanese Patent Application No. 2001-213666 (filed in Japan on Jul. 13, 2001) are herein incorporated by reference. Various modifications and variations can be made without departing from the sprit of the present invention. The scope of the invention is defined with reference to the following claims.

What is claimed is:

1. A driving force controlling apparatus for a four-wheel drive vehicle, comprising:
   main driven wheels which are one of front and rear road wheels;
   auxiliary driven wheels which are the other of the front and rear road wheels;
   a slip detecting section that detects an acceleration slip quantity of the main driven wheels;
   a driving force demand determining section that determines whether there is a vehicular driver's demand on the driving force;
   an auxiliary driven wheel driving force distribution rate maximum value updating section that calculates a driving force distribution ratio between the front and rear road wheels in such a manner that a driving force distribution rate for the auxiliary driven wheels is updated to a maximum value on the basis of the acceleration slip quantity of the main driven wheels detected by the slip detecting section when the driving force demand determining section determines that there is the vehicular driver's demand on the driving force;
   a slip responsive driving force distribution ratio calculating section that calculates the driving force distribution ratio between the front and rear road wheels in accordance with the acceleration slip quantity when the driving force demand determining section determines that there is no vehicular driver's demand on the driving force; and
   a driving force adjusting section that variably adjusts the driving force between the front and rear road wheels, wherein the driving force adjusting section adjusts the driving force based on the driving force distribution ratio between the front and rear road wheels calculated by at least one of the auxiliary driven wheel driving force distribution rate maximum value calculating section and the slip responsive driving force distribution ratio calculating section.

2. A driving force controlling apparatus for a four-wheel drive vehicle as claimed in claim 1, wherein the auxiliary driven wheel driving force distribution rate maximum value updating section updates the acceleration slip quantity of the main driven wheels to the maximum value.

3. A driving force controlling apparatus for a four-wheel drive vehicle as claimed in claim 1, further comprising a road wheel velocity detecting section that detects road wheel velocities of the road wheels, wherein the slip detecting section detects the acceleration slip quantity from a front-and-rear road wheel velocity difference between the front and rear road wheels.

4. A driving force controlling apparatus for a four-wheel drive vehicle as claimed in claim 1, further comprising: a main driven wheel torque calculating section that calculates a drive torque transmitted to the main driven wheels; and a road surface reaction force limit torque calculating section that calculates a road surface reaction force limit torque of the main driven wheels, wherein the slip detecting section detects the acceleration slip quantity from a difference between the drive torque transmitted to the main driven wheels and the road surface reaction force limit torque of the main driven wheels.

5. A driving force controlling apparatus for a four-wheel drive vehicle as claimed in claim 1, further comprising a brake manipulation detecting section that detects a manipulation of a brake of the vehicle, wherein the driving force demand determining section determines that there is no vehicular driver's demand on the driving force when the brake manipulation detecting section detects that the brake manipulation has occurred and determines that there is the vehicular driver's demand on the driving force when the brake manipulation detecting section detects that the brake manipulation has not occurred.

6. A driving force controlling apparatus for a four-wheel drive vehicle as claimed in claim 1, further comprising an accelerator manipulation detecting section that detects whether an accelerator is manipulated, wherein the driving force demand detecting section determines that there is the vehicular driver's demand on the driving force when the accelerator manipulation detecting section detects that the accelerator is manipulated and determines that there is no vehicular driver's demand on the driving force when the accelerator manipulation detecting section detects that no accelerator is manipulated.

7. A driving force controlling apparatus for a four-wheel drive vehicle as claimed in claim 1, further comprising:
   a vehicular body velocity detecting section that detects a vehicular body velocity of the vehicle;
   a load responsive driving force distribution calculating section that calculates the driving force distribution ratio between the front and rear road wheels in accordance with a load distribution between the front and rear road wheels; and
   a driving force distribution ratio adjusting section that selects the driving force distribution ratio between the front and rear road wheels whose driving force distribution rate for the auxiliary driven wheels is larger as calculated by one of the auxiliary driven wheel driving force distribution rate maximum value updating section and the load responsive driving force distribution calculating section,
   wherein, when the vehicular body velocity is equal to or lower than a predetermined vehicular velocity and when the driving force distribution ratio adjusting section selects the driving force distribution rate for the auxiliary driven wheels as calculated by the auxiliary driven wheel driving force distribution rate maximum value updating section, the driving force distribution ratio adjusting section variably adjusts the driving force distribution ratio between the front and rear road wheels such that the driving force distribution ratio becomes the selected driving force distribution ratio.

8. A driving force controlling apparatus for a four-wheel drive vehicle as claimed in claim 1, wherein the auxiliary driven wheel driving force distribution rate maximum value updating section comprises a comparing section that compares the driving force distribution rate for the auxiliary driven wheels calculated at a present calculation cycle with that calculated at a previous calculation cycle to determine whether the driving force distribution rate for the auxiliary driven wheels calculated at the present calculation cycle is larger than that calculated at the previous calculation cycle and wherein the auxiliary driven wheel driving force distribution rate maximum value updating section updates the driving force distribution rate for the auxiliary driven wheels calculated at the previous calculation cycle to that calculated at the present calculation cycle when the driving force distribution rate for the auxiliary driven wheels calculated at the present calculation cycle is larger than that calculated at the previous calculation cycle.

9. A driving force controlling apparatus for a four-wheel drive vehicle, comprising:

main driven wheels which are one of front and rear road wheels;

auxiliary driven wheels which are the other of the front and rear road wheels;

a slip detecting section that detects an acceleration slip quantity of the main driven wheels;

a driving force demand determining section that determines whether there is a vehicular driver's demand on the driving force;

an auxiliary driven wheel driving force distribution rate maximum value updating section that calculates a driving force distribution ratio between the front and rear road wheels in such a manner that a driving force distribution rate for the auxiliary driven wheels is updated to a maximum value on the basis of the acceleration slip quantity of the main driven wheels detected by the slip detecting section when the driving force demand determining section determines that there is the vehicular driver's demand on the driving force;

an auxiliary driven wheel driving force distribution rate reducing section that calculates the driving force distribution ratio between the front and rear road wheels in such a manner that the driving force distribution rate for the auxiliary driven wheels is reduced or zeroed when there is no vehicular driver's demand on the driving force; and a driving force adjusting section that variably adjusts the driving force between the front and rear road wheels, wherein the driving force adjusting section adjusts the driving force based on the driving force distribution ratio between the front and rear road wheels calculated by at least one of the auxiliary driven wheel driving force distribution rate maximum value calculating section and the auxiliary driven road wheel driving force distribution rate reducing section.

10. A driving force controlling apparatus for a four-wheel drive vehicle as claimed in claim 9, further comprising a vehicular body velocity detecting section that detects a vehicular body velocity, wherein the auxiliary driven wheel driving force distribution rate reducing section calculates the driving force distribution ratio between the front and rear road wheels in such a manner that the driving force distribution rate for the auxiliary driven wheels is reduced in accordance with a reduction in the vehicular body velocity.

11. A driving force controlling apparatus for a four-wheel drive vehicle as claimed in claim 9, further comprising a road wheel velocity detecting section that detects each road wheel velocity of the road wheels, wherein the auxiliary driven wheel driving force distribution rate reducing section calculates the driving force distribution ratio between the front and rear road wheels in such a manner that the driving force distribution rate of the auxiliary driven wheels is reduced in accordance with a reduction in each road wheel velocity.

12. A driving force controlling apparatus for a four-wheel drive vehicle as claimed in claim 9, wherein the auxiliary driven wheel driving force distribution rate reducing section reduces the distribution ratio of the driving force between the front and rear road wheels in such a manner that the driving force distribution rate for the auxiliary driven wheels is reduced in accordance with an elapse of time.

13. A driving force controlling apparatus for a four-wheel drive vehicle as claimed in claim 9, wherein the auxiliary driven wheel driving force distribution rate maximum value updating section comprises a comparing section that compares a magnitude of a front-and-rear road wheel velocity difference between road wheel velocities of the front and rear road wheels calculated at a present calculation cycle with that calculated at a previous calculation cycle to determine whether the front-and-rear road wheel velocity difference calculated at the present calculation cycle is larger than with that calculated at a previous calculation cycle and wherein the auxiliary driven wheel driving force distribution rate maximum value updating section updates the front-and-rear road wheel velocity difference between the front and rear road wheels calculated at the previous calculation cycle to that calculated at the present calculation cycle when the front-and-rear road wheel velocity difference calculated at the present calculation cycle is larger than that calculated at a previous calculation cycle.

14. A driving force controlling apparatus for a four-wheel drive vehicle as claimed in claim 13, wherein the auxiliary driven wheel driving force distribution rate maximum value updating section comprises a front-and-rear road wheel velocity difference calculating section that calculates a velocity difference between the front and rear road wheels to be used to calculate the driving force distribution ratio between the front and rear road wheels when the driving force demand determining section determines that there is the vehicular driver's demand on the driving force as follows:

$\Delta Vn = \Delta Vn-1 (Vcar\ n / Vcar\ n-1) \times 0.7$, wherein $\Delta Vn-1$ denotes the front-and-rear road wheel velocity difference calculated at the previous calculation cycle, $Vcar\ n$ denotes a vehicular body velocity calculated at the present calculation cycle, and $Vcar\ n-1$ denotes the vehicular body velocity calculated at the previous calculation cycle.

15. A driving force controlling apparatus for a four-wheel drive vehicle as claimed in claim 13, wherein the auxiliary driven wheel driving force distribution rate maximum value updating section comprises a front-and-rear road wheel velocity difference calculating section that calculates a velocity difference between the front and rear road wheels to be used to calculate the driving force distribution ratio between the front and rear road wheels when the driving force demand determining section determines that there is the vehicular driver's demand on the driving force as follows:

$\Delta Vn = \Delta Vn-1(Vf\ n/Vf\ n-1) \times 0.7$, wherein $\Delta Vn-1$ denotes the front-and-rear road wheel velocity difference calculated at the previous calculation cycle, $Vfn$ denotes a front road wheel velocity calculated at the present calculation cycle, and $Vf\ n-1$ denotes the front road wheel velocity calculated at the previous calculation cycle.

16. A driving force controlling apparatus for a four-wheel drive vehicle as claimed in claim 13, wherein the auxiliary driven wheel driving force distribution rate maximum value updating section comprises a front-and-rear road wheel velocity difference calculating section that calculates a velocity difference between the front and rear road wheels to be used to calculate the driving force distribution ratio between the front and rear road wheels when the driving force demand determining section determines that there is the vehicular driver's demand on the driving force as follows:

$\Delta Vn = \Delta Vn$–predetermined value, wherein $\Delta Vn$ at a right side of the equation denotes the front-and-rear road wheel velocity difference calculated at the previous calculation cycle.

17. A driving force controlling apparatus for a four-wheel drive vehicle as claimed in claim 13, wherein the auxiliary driven wheel driving force distribution rate maximum value updating section comprises a front-and-rear road wheel velocity difference calculating section that calculates a velocity difference between the front and rear road wheels to be used to calculate the driving force distribution ratio between the front and rear road wheels, the calculated front-and-rear road wheel velocity difference being forcefully zeroed when the driving force demand determining section determines that there is the vehicular drivers demand on the driving force.

18. A driving force controlling apparatus for a four-wheel drive vehicle as claimed in claim 9, further comprising:
    a vehicular body velocity detecting section that detects a vehicular body velocity of the vehicle;
    a load responsive driving force distribution calculating section that calculates the driving force distribution ratio between the front and rear road wheels in accordance with a load distribution between the front and rear road wheels; and
    a driving force distribution ratio adjusting section that selects the driving force distribution ratio between the front and rear road wheels whose driving force distribution rate for the auxiliary driven wheels as calculated by one of the auxiliary driven wheel driving force distribution rate maximum value updating section and the load responsive driving force distribution calculating section,
    wherein, when the vehicular body velocity is equal to or lower than a predetermined vehicular velocity and when the driving force distribution ratio adjusting section selects the driving force distribution rate for the auxiliary driven wheels as calculated by the auxiliary driven wheel driving force distribution rate maximum value updating section, the driving force distribution ratio adjusting section variably adjusts the driving force distribution ratio between the front and rear road wheels such that the driving force distribution ratio becomes the selected driving force distribution ratio.

19. A driving force controlling method for a four-wheel drive vehicle, the four-wheel drive vehicle including main driven wheels which are one of front and rear road wheels; and auxiliary driven wheels which are the other of the front and rear road wheels, the driving force controlling method comprising:
    detecting an acceleration slip quantity of the main driven wheels;
    determining whether there is a vehicular driver's demand on the driving force;
    calculating a driving force distribution ratio between the front and rear road wheels in such a manner that a driving force distribution rate for the auxiliary driven wheels is updated to a maximum value on the basis of the detected acceleration slip quantity of the main driven wheels when it is determined that there is the vehicular driver's demand on the driving force;
    calculating the driving force distribution ratio between the front and rear road wheels in accordance with the acceleration slip quantity when it is determined that there is no vehicular driver's demand on the driving force; and
    variably adjusting the driving force between the front and rear road wheels based on the calculated driving force distribution ratio between the front and rear road wheels.

20. A driving force controlling apparatus for a four-wheel drive vehicle, the four-wheel drive vehicle comprising: main driven wheels which are one of front and rear road wheels; and auxiliary driven wheels which are the other of the front and rear road wheels, the driving force controlling apparatus comprising:
    slip detecting means for detecting an acceleration slip quantity of the main driven wheels;
    driving force demand determining means for determining whether there is a vehicular driver's demand on the driving force;
    auxiliary driven wheel driving force distribution rate maximum value updating means for calculating a driving force distribution ratio between the front and rear road wheels in such a manner that a driving force distribution rate for the auxiliary driven wheels is updated to a maximum value on the basis of the acceleration slip quantity of the main driven wheels detected by the slip detecting means when the driving force demand determining means determines that there is the vehicular driver's demand on the driving force;
    slip responsive driving force distribution ratio calculating means for calculating the driving force distribution ratio between the front and rear road wheels in accordance with the acceleration slip quantity when the driving force demand determining means determines that there is no vehicular driver's demand on the driving force; and
    driving force adjusting means for variably adjusting the driving force between the front and rear road wheels, wherein the driving force adjusting means adjusts the driving force based on the driving force distribution ratio between the front and rear road wheels calculated by at least one of the auxiliary driven wheel driving force distribution rate maximum value calculating means and the slip responsive driving force distribution ratio calculating means.

* * * * *